(12) United States Patent
Heumann et al.

(10) Patent No.: US 7,590,636 B1
(45) Date of Patent: Sep. 15, 2009

(54) KNOWLEDGE FILTER

(75) Inventors: Michael Carl Heumann, Sebastopol, CA (US); Keith Cooley, Palo Alto, CA (US)

(73) Assignee: KL Internet Applications, LLC, Wilmington, DE (US)

( * ) Notice: Subject to any disclaimer, the term of this patent is extended or adjusted under 35 U.S.C. 154(b) by 0 days.

(21) Appl. No.: 11/348,037

(22) Filed: Feb. 6, 2006

Related U.S. Application Data

(63) Continuation of application No. 09/685,165, filed on Oct. 5, 2000, now Pat. No. 7,031,952.

(60) Provisional application No. 60/158,496, filed on Oct. 8, 1999.

(51) Int. Cl.
*G06F 7/00* (2006.01)
*G06F 17/00* (2006.01)
*G06F 17/30* (2006.01)
*G06F 17/18* (2006.01)
*G06F 19/00* (2006.01)
*G06F 9/44* (2006.01)
*G06N 7/02* (2006.01)
*G06N 7/06* (2006.01)

(52) U.S. Cl. ............... 707/10; 707/3; 707/5; 707/102; 702/179; 706/52

(58) Field of Classification Search ............. 707/1–2, 707/3, 5, 10, 102; 715/500; 600/300; 706/52; 702/179

See application file for complete search history.

(56) References Cited

U.S. PATENT DOCUMENTS

| | | | |
|---|---|---|---|
| 4,996,642 A | 2/1991 | Hey | |
| 5,418,943 A | 5/1995 | Borgida et al. | |
| 5,583,763 A | 12/1996 | Atcheson et al. | |
| 5,704,017 A | 12/1997 | Heckerman et al. | |
| 5,706,493 A | 1/1998 | Sheppard, II | |
| 5,734,890 A | 3/1998 | Case et al. | |
| 5,768,578 A | 6/1998 | Kirk et al. | |
| 5,790,426 A | 8/1998 | Robinson | |
| 5,790,935 A | 8/1998 | Payton | |
| 5,806,060 A | 9/1998 | Borgida et al. | |
| 5,809,493 A | 9/1998 | Ahamed et al. | |
| 5,819,243 A | 10/1998 | Rich et al. | |
| 5,822,744 A * | 10/1998 | Kesel ........................ | 706/52 |

(Continued)

*Primary Examiner*—Wilson Lee
*Assistant Examiner*—Cheryl M Shechtman

(57) ABSTRACT

A method and system for sharing knowledge is disclosed. The method and system comprises receiving information input into a database and organizing items of information in the database. The method and system further includes collecting ratings and comments associated with each item of information and allowing users to access and sort items of information according to selected rating criteria in order to find the most reliable and/or valuable information from the database. In a second aspect, the present invention including an interface for providing information concerning a subject is disclosed. The interface comprises a first area that shows the subject and contributor name; and a second area that shows the content of the information item. The interface includes a third area that shows rating related to the subject; and a fourth area that allows users to submit ratings for the information item. Accordingly, a knowledge sharing system and interface are provided which allows every member of a knowledge sharing group to benefit from aggregate knowledge, experience and opinions of other members of the group. The system and method allows individual members to easily locate the information from a collectively generated knowledge base that is most consistent with that individual's personal measures of value in the information.

40 Claims, 13 Drawing Sheets

U.S. PATENT DOCUMENTS

| | | | |
|---|---|---|---|
| 5,832,472 A | 11/1998 | Sheppard, II | |
| 5,839,438 A * | 11/1998 | Graettinger et al. | 600/300 |
| 5,842,199 A | 11/1998 | Miller et al. | |
| 5,854,923 A | 12/1998 | Dockter et al. | |
| 5,867,799 A | 2/1999 | Lang et al. | |
| 5,872,850 A | 2/1999 | Klein et al. | |
| 5,878,233 A | 3/1999 | Schloss | |
| 5,878,399 A | 3/1999 | Peralto | |
| 5,884,282 A | 3/1999 | Robinson | |
| 5,893,909 A | 4/1999 | Nomura et al. | |
| 5,909,679 A | 6/1999 | Hall | |
| 5,918,014 A | 6/1999 | Robinson | |
| 5,937,397 A | 8/1999 | Callaghan | |
| 5,960,173 A | 9/1999 | Tang et al. | |
| 5,966,512 A | 10/1999 | Bates et al. | |
| 5,974,412 A | 10/1999 | Hazlehurst et al. | |
| 5,983,214 A | 11/1999 | Lang et al. | |
| 5,991,595 A | 11/1999 | Romano et al. | |
| 5,999,975 A | 12/1999 | Kittaka et al. | |
| 6,006,218 A | 12/1999 | Breese et al. | |
| 6,018,738 A | 1/2000 | Breese et al. | |
| 6,026,396 A | 2/2000 | Hall | |
| 6,029,161 A | 2/2000 | Lang et al. | |
| 6,041,311 A | 3/2000 | Chislenko et al. | |
| 6,058,391 A | 5/2000 | Gardner | |
| 6,064,971 A | 5/2000 | Hartnett | |
| 6,064,980 A | 5/2000 | Jacobi et al. | |
| 6,092,049 A | 7/2000 | Chislenko et al. | |
| 6,112,186 A | 8/2000 | Bergh et al. | |
| 6,115,709 A | 9/2000 | Gilmour et al. | |
| 6,182,067 B1 * | 1/2001 | Presnell et al. | 707/5 |
| 6,256,556 B1 | 7/2001 | Zenke | |
| 6,587,841 B1 | 7/2003 | DeFrancesco et al. | |
| 6,772,139 B1 * | 8/2004 | Smith, III | 707/3 |
| 7,031,952 B1 | 4/2006 | Heumann et al. | |
| 2001/0047290 A1 | 11/2001 | Petras et al. | |

* cited by examiner

| | -Select One-<br>Date (default)<br>Overall Rating<br>✓ Taste Rating (criteria 1)<br>Health Rating (criteria 2)<br>Ease of preparation (crit. 3)<br>Number of positive comments<br>Name of recipe<br>Name of contributor | ⎯506 | Index page showing standard and custom sorting options for lists of contributions (in this case recipes) |

Main Dishes

| Sort Recipes By: | | |
|---|---|---|
| Taste Rating (criteria 1) ⇕ | Standard Sort | Custom Sort |

Search Recipe Index     Search for Ingredients Within all Recipes

Recipes sorted by date

| Recipe | Overall Rating | Taste Rating | Health Rating | Ease of Preparation Rating | Percentage of supporting comments | Contributed by: |
|---|---|---|---|---|---|---|
| ∿∿∿ ∿ | D | 2.0 | 1.0 | 2.0 | 0 | |
| ∿∿ | B | 3.5 | 3.0 | 3.0 | 100 | |
| ∿ ∿∿ | B | 4.0 | 4.0 | 3.3 | 100 | |
| ∿∿ ∿∿ | | | | | | |
| ∿∿ | | | | | | |
| ∿∿ ∿∿ | | | | | | |
| ∿∿ ∿ | | | | | | |
| ∿∿ | | | | | | |
| ∿ ∿∿ | | | | | | |
| ∿∿ ∿∿ | N/A | 0.0 | 0.0 | 0.0 | 0 | |
| ∿∿∿ | N/A | 0.0 | 0.0 | 0.0 | 0 | |
| ∿∿ ∿∿ | N/A | 0.0 | 0.0 | 0.0 | 0 | |
| ∿∿ ∿ | N/A | 0.0 | 0.0 | 0.0 | 0 | |
| ∿∿ | B | 4.0 | 2.7 | 4.0 | 100 | |
| ∿ ∿∿ | A | 4.0 | 5.0 | 5.0 | 100 | |

FIG.5

Map of Categories in this Knowledge Base

Recipes
- Hors d'oeuvres
  - Caponata: Sweet and Sour Eggplant and Tomato Hors d'oeuvre
  - Eggplant Caviar
  - Chicken Liver
  - Anchovy Balls
  - FIELD TRIP ANTIPASTO
  - ARTICHOKE FRITTATA
  - HOT CRAB DIP
  - SALMON MOUSSE
  - Anchovy Balls
  - Stuffed Mushrooms
  - Rocky Mountain Oysters
- Salads
  - Bulgar and Chicken Salad
  - Chicken and Fruit Salad with
  - Cranberry Mold
  - Caesar Chicken Pasta Salad
  - Curried Rice Salad with Melon, Raisins, and Peanuts
  - BALKAN CUCUMBER SALAD
  - CUCUMBER AND POTATO SALAD
  - DUTCH HERRING SALAD
  - Cranberry Apple Gelatin Mold
  - Triple Cranberry Sauce

FIG.6

World Family Cookbook

The Knowledge Center

- Visual Category Map
- Search Categories
- Create New Category
- Suggestion Box
- Contact Us
- Help

Make a comment about this recipe. ~802

If you would like to share your experience or any ideas about this recipe, please enter your comments here:

[text area] ~804

Choose from one of the following submission options: ~806

- ● Positive comment
- ○ Negative comment
- ○ Other comment or link

Enter your email address here:

[text field] ~808

(optional.. if you'd like response from others) and then... [Submit]

1002
Submit a new recipe for: Main Dishes — 1004

Before you contribute a recipe there are two steps you must follow:
Step 1: Find the Appropriate sub-category
Finding the right sub-category for your contribution is just a matter of browsing until you get to the appropriate category. When you look for the right sub-category, get as specific as possible. Dig deep into the CookBook, looking for the right subject area. You cannot contribute a recipe to the top level category. You can only contribute to a sub-category that can include recipes.
Step 2: Contribute your recipe from the appropriate Sub-category
Contribute your recipe from the category you think most appropriate. Currently you are in the main dishes category. If this is not the appropriate category for your recipe, click here to go the top level category and find the right sub-category.

If you would like to share one of your favorite recipes, enter it into the field below. You may paste or type text into the field.

[text area — 1006]

Recipe Name: _____ — 1008
Source of recipe or link: _____ — 1010
Enter your email address here: _____ — 1012
(optional. Use if you want feedback)

[Submit Recipe]

KNOWLEDGE FILTER

CROSS REFERENCE TO RELATED APPLICATIONS

The present application is a continuation of U.S. application Ser. No. 09/685,165, filed Oct. 5, 2000 now U.S. Pat. No. 7,031,952, entitled "Knowledge Filter," which claims benefit of 60/158,496, filed Oct. 8, 1999, entitled "Knowledge Filter," both of which are incorporated herein by reference in their entireties.

FIELD OF THE INVENTION

The present invention relates to a system and apparatus for allowing groups of individuals connected to a computer network such as the Internet to collaboratively build a self-organizing knowledge base that uses ratings and commentary provided by a plurality of users to rank, sort and deliver the information from the knowledge base which best matches each individual user's personal criteria for value in information.

BACKGROUND OF THE INVENTION

In the last few years, a well known network of interconnected computers called the Internet has made it possible for people to use personal computers linked to central systems to engage in two-way information exchange. Existing systems of Internet-based information exchange include News-Groups, Listservs, threaded discussion forums and Online databases. Local area networks (LANS) and Intranets also allow people connected to private computer networks to share information among members of an organization. Network based systems differ from traditional media formats in that they allow users to contribute as well as to access information. The most common form of network-based knowledge-sharing technology is called threaded discussion. The format used by most threaded discussion systems pre-dates the World Wide Web and is based on an older Internet protocol called Usenet. A threaded discussion is a forum where one person can "post" a communication (start a "thread") and others can reply to that post or start a new thread. There are three main problems with threaded discussion:

a) There is no way of knowing how useful or accurate a given contribution or "posting" is.

b) There is no easy way to organize the postings into a logical knowledge structure.

c) Once a large number of postings are added to the system, it becomes unwieldy and very difficult to find the useful information among the many unedited posts.

A number of approaches have been used to try to increase the value of information in threaded discussion forums. One method of editing involves deleting older messages. Some such systems allow users to specify the age of messages that appear on their screen. In such systems older messages are lost, regardless of their value. Other systems move the older messages to an archive where they can be retrieved only if the user already knows what he or she is searching for so that search terms can be used to locate relevant messages. Another type of system relies on a moderator to edit messages for value before they are posted. Moderated discussion forums or Usenet "newsgroups" are generally favored over un-moderated ones that can quickly become clogged with redundant messages, turn into shouting matches or commercial solicitations. Some of the problems with moderated discussion forums are that:

a) The editorial process is placed in the hands of one person who may have personal biases that control the content of the system.

b) The moderator's job can become overwhelming when the number of posts increases.

c) There is significant personnel cost associated with the maintenance of such a system.

d) The moderator's criteria for value in information may not match that of individual users.

There are a number of other knowledge management systems that allow groups of people to share a central body of knowledge. Groupware systems allow individuals to contribute to, or to comment on a shared document or database. These systems generally allow an authorized person or persons to accept or reject contributions made by others. Groupware systems tend to be inter-active, but not democratic. Another field related to the present invention is the field of polling software. Polling software is used to conduct surveys or polls on specific topics. This type of software uses database technology to track opinions and report statistics on topics that are chosen by the administrators of the system. The more sophisticated polling software systems allow users to rate items for more than one criteria.

Another related field is called collaborative filtering. Collaborative filtering is a process that collects information on the tastes or interests of members of a group and makes predictions about what other members of the group will like based on similarities found in the collected data. This is a passive process for the user and is very different from the active process of ratings-based filtering described herein.

OBJECTS OF THE INVENTION

In order to make use of the vast amount of unedited information available to a computer connected to a network such as the Internet, a method of filtering must be found that will allow individuals to ascertain which pieces of information are most reliable, useful or meaningful to them. If a large number of individuals are allowed to contribute knowledge and opinions to a central database, a method for automatically organizing the data into a logical knowledge structure must be found. Since many people might contribute information to a database that may include a broad range of value or reliability, and since many other people interested in the same subject may have experience or knowledge relating to each contribution, it would be useful to create a system that would collect opinions, ratings and commentary from a plurality of users and would calculate the aggregate ratings for a number of multiple criteria of value and make them available to each individual user. It would also be useful to use the rating scores as a means for sorting, filtering and organizing the information in the database in accordance with the rating scores given by the group. Since each individual has a different idea of what sort of rating criteria are important to them, it would also be useful to be able to dynamically sort the information in a way that most closely matches each individual's criteria for value in information. In order for a new piece of information contributed to a large database to be seen by enough people to receive ratings, a method must also be found to give new postings broad exposure while retaining the system's ability to sort postings according to their group rating data. Additionally, it would be useful for an individual seeking information on a subject to be able to know what the main arguments for and against a given opinion are, in order to be able to make an informed decision regarding the subject. It would also be useful to provide a means of communication that would allow an individual to communicate with the provider of opinions.

The object of the present invention is to design a self-organizing system that is easy to navigate, easy to contribute content and opinions to, and that automatically presents the information that is most meaningful or useful to an individual user to that users attention without discarding the rest of the information in the database. A further object of the invention is to provide easy to interpret visual symbols and rating data for a number of information contributions in a way that allows them to be simultaneously displayed on a computer screen before they are selected and viewed by a user. Another object of the invention is to provide the framework for such a system that can easily be adopted to a number of subjects that may have varying rating criteria and subject organization parameters.

Such a system would effectively combine a computer network's ability to store and process vast amounts of information with the distinctly human ability to discern meaning and value.

What is needed then, is a system that is similar to threaded discussion, but that records the reactions and additional experience of the many members of a knowledge-sharing community and then uses this additional information associated with each posting to organize the database in a way that allows individual users to sort and retrieve the information from the database that is most reliable and most useful to them and to have access to both sides of controversial issues. The utility of such a system would be further enhanced if it were self-organizing, searchable and easy to navigate. If properly designed, such a system would also facilitate the cross-fertilization of ideas across academic and geographical boundaries and allow broader access to reliable information and opinion through the process which could be described as the democratization of knowledge. The present invention addresses such a need.

SUMMARY OF THE INVENTION

A method and system for sharing knowledge is disclosed. The method and system comprises receiving information input into a database and organizing items of information in the database. The method and system further includes collecting ratings and comments associated with each item of information and allowing users to access and sort items of information according to selected rating criteria in order to find the most reliable and/or valuable information from the database.

In a second aspect, the present invention includes a graphic user interface for providing information concerning a subject which is disclosed. The interface comprises a first area that shows the subject and contributor name, and a second area that shows the content of the information item. The interface includes a third area that shows ratings related to the subject; and a fourth area that allows users to submit ratings for the information item.

Accordingly, a knowledge sharing system and interface are provided which allows every member of a knowledge sharing group to benefit from the aggregate knowledge, experience and opinions of other members of the group. The system and method allows individual members to easily locate and filter the information from a collectively generated knowledge base that is most consistent with that individual's personal measures of value in information.

BRIEF DESCRIPTION OF THE DRAWINGS

FIG. 5 is an illustration of the Index Window user interface of one embodiment of the invention, showing detailed features of the knowledge output of the system in response to a user query.

FIG. 6 is an illustration of the display of the dynamically generated visual category map navigation system of the knowledge base.

FIG. 8 is an illustration of the Comments interface of one embodiment of the invention, through which the user can submit positive, negative, or neutral comments.

FIG. 10 is an illustration of the New Item Submittal interface.

DETAILED DESCRIPTION

Figure 1:
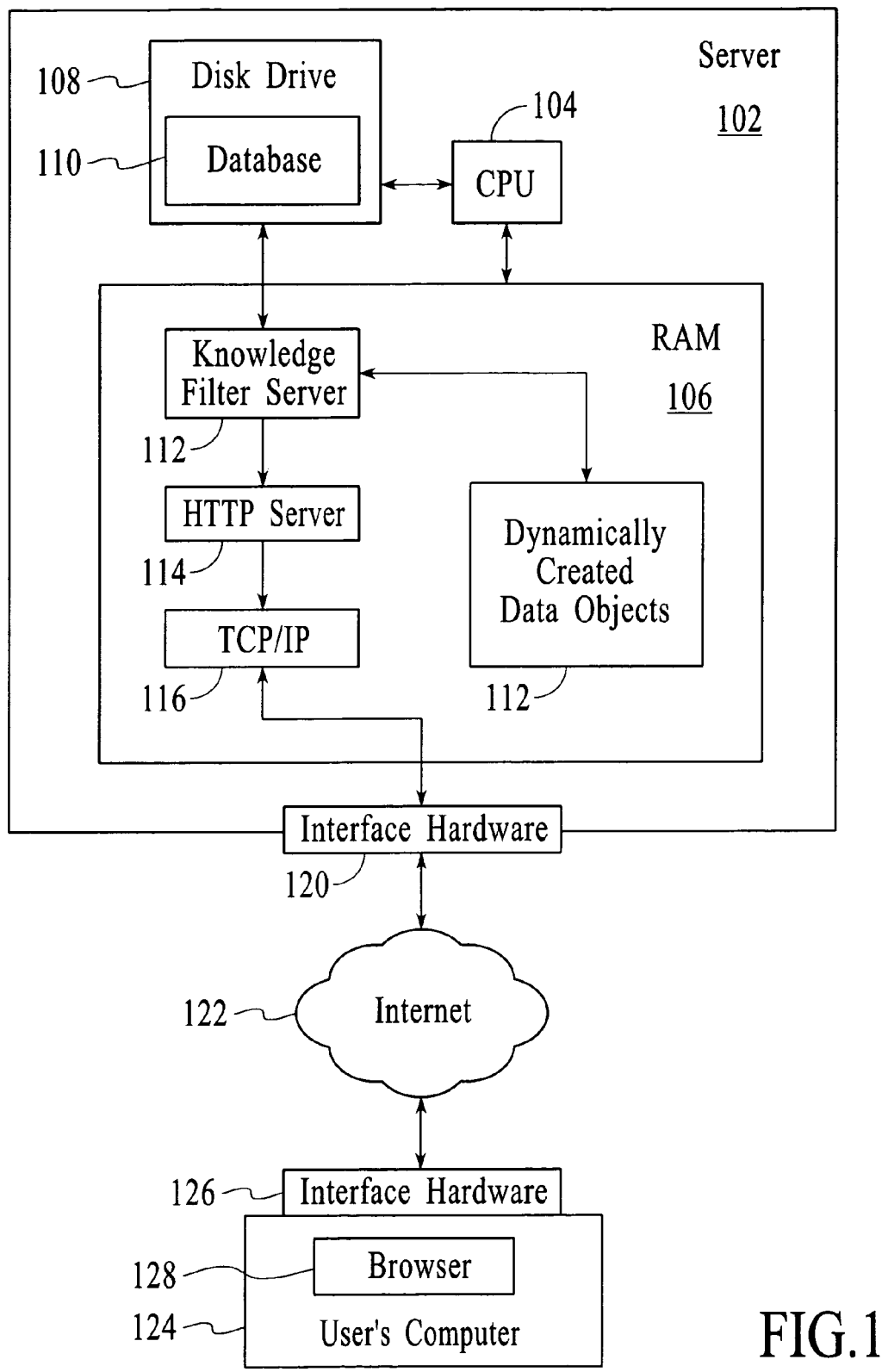
FIG. 1 is a block diagram illustrating the overall architecture and physical deployment of the KnowledgeFilter system.

The present invention relates to a system and apparatus for allowing groups of individuals connected to a computer network such as the Internet to collaboratively build a self-organizing knowledge base that uses ratings and commentary provided by a plurality of users to rank, sort and deliver the information from the knowledge base which best matches each individual user's personal criteria for value in information. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

1. Introduction

KnowledgeFilter is a knowledge-sharing system which allows every member of a knowledge-sharing group to benefit from the aggregate knowledge, experience and opinions of other members of the group and allows individual members of the group to easily locate the information from the collectively generated knowledge base that is most consistent with that individual's personal measures of value in information. The system accomplishes these goals by:

1) Allowing members of the group to access and navigate a collectively-generated knowledge base.

2) Allowing members of the group to submit content to the knowledge base once they have navigated to the appropriate topic area.

3) Soliciting and tracking multi-criteria ratings and pro & con comments on content submissions from other members of the group.

4) Calculating and graphically displaying the aggregate feedback and commentary support level (corroboration level) of the group regarding each content submission.

5) Allowing users to sort the content submissions under any given topic area according to the aggregate scores for any individual rating criteria or a personally selected combination of criteria, causing the most valuable content to rise to the top of a dynamically generated list of content submissions. Custom sorting allows users to assign a weighting factor to each criteria by responding to prompts.

6) Allowing users to sort the content according to the level of comment support as determined by the ratio of positive to negative comments submitted by the knowledge-sharing group.

7) Allowing users to read or access the selected content in a graphic display format that also provides:

a) Graphic symbols representing the aggregate rating scores for each of three main criteria and the level of comment support for the content submission b) A side-by-side display of comments supporting or disputing the content submission allowing individuals to make informed decisions and choices of what to believe or what methods to use to accomplish a particular goal c) A display of other comments providing additional information, links or opinions on the content submission 8) Allowing users to search the knowledge base by key words appearing a) Within the subject lines describing content submissions b) Within the text of the content submissions themselves 9) Allowing users to add new subject or topic divisions to the knowledge base.

Additional features of the system include:

1) A knowledge base map that is automatically generated as topics and sub-topics are added to the knowledge base.

2) A system of tracking rating submissions that prevents any one user from voting on a given content submission more than one time.

3) Ratings associated with individual contributors are tracked, allowing content submissions to be sorted by source or contributor ranking.

4) An administrative function that allows a system administrator to edit content submissions and the knowledge base mapping structure.

5) Instant e-mail links to the contributors of content or comment submissions to facilitate communication between knowledge base users with interest or knowledge in a specific topic.

6) A feature that initially displays the content submissions under a topic in order of submission date, allowing new submissions to be exposed to the group for ratings and comment feedback.

The software can be used to collaboratively generate new knowledge in a specialized field as well as to combine, organize, access and filter existing bodies of knowledge or opinion. The basic software shell can be easily changed to adapt to any type of knowledge-sharing forum.

One embodiment of the software uses a system of HTML based text color-coding to allow users to quickly determine how individual contributions to a knowledge-base are rated by other users. The hue and saturation of each text link in a sorted list reveals immediate information on such parameters as how consistent individual postings are with other perspectives or facts, or how well a method, product or idea actually works in the real world.

2. General Operation

FIG. 1 is a block diagram illustrating the overall architecture and physical deployment of the KnowledgeFilter system. In FIG. 1, the numeral "102" designates generally the hardware components of a server computer designed to store and deliver information over the Internet. The server computer is of a performance level sufficient to deliver information to multiple remote users on the Internet, and is at least as powerful as a computer with 104 an Intel Pentium central processing unit (CPU), running at 366 mHz, with a minimum of 96 Mb of random access memory (RAM) 106, or any equivalent processing system. The RAM is used for operation of software and temporary storage of data objects necessary for the operation of the system.

The server computer 102 also includes a data storage facility (so-called non-volatile memory on a disk drive) 108, which is used to contain the database components of the system 110, as well as non-volatile components of the software, such as a copy of the operational code of the invention.

The server computer 102 also includes within the RAM 106 the operational software code of the system (the KnowledgeFilter Server, or KFS) 112; an HTTP (hypertext transport protocol) server, also known as a Web Server (or WS) 114; interfacing software called TCP/IP (transmission control protocol/Internet Protocol) 116 for communications with remote users through the Internet 122. Also included within the RAM 106 are temporary data objects 118 created during the operation of the software. These temporary data objects are more fully described below The server computer 102 also includes interfacing hardware 120 to enable it to communicative over the Internet.

FIG. 1 also illustrates the hardware and software components of the remote user of the system, generally comprised of a computer commonly known as a personal computer 124, comprised of hardware components normally understood to be included in such a computer, such as a CPU, and RAM. The remote computer is at least as powerful as a computer with an Intel Pentium central processing unit (CPU), running at 166 mHz, with a minimum of 32 Mb of RAM, or any equivalent processing system. The remote computer 120 also includes interfacing hardware 116, typically such as a modem, enabling access to the Internet through a dial-up telephone connection. The remote computer 120 also includes software called an Internet browser 128 such as Microsoft Internet Explorer or Netscape Navigator, or a browser of generally equivalent capability, running in RAM.

The general operation of the system is as follows. To consult a KnowledgeBase using the system of the invention, the remote user at 124 sends a request for a display page on a web site located within the database on the server at 110. The request is routed through the Internet 122, and is received by the Web Server 114 in the server computer. The Web server interprets the request, and passes the request to KnowledgeFilter Server. The KnowledgeFilter Server interprets the request, retrieves data from the KnowledgeBase database, instantiates required data objects 118 in RAM, performs necessary calculations, composes a computer file commonly referred to as a web page in the Hypertext Markup Language (HTML), comprised of static components retrieved from the database and dynamic components derived from calculations on the data objects 118, and then sends the resulting computer file through the interfacing equipment 120, over the Internet 122, back to the remote user's computer at 124. The remote computer at 124 displays the resulting file through the browser software 128.

3. Database Structure

Figure 2:
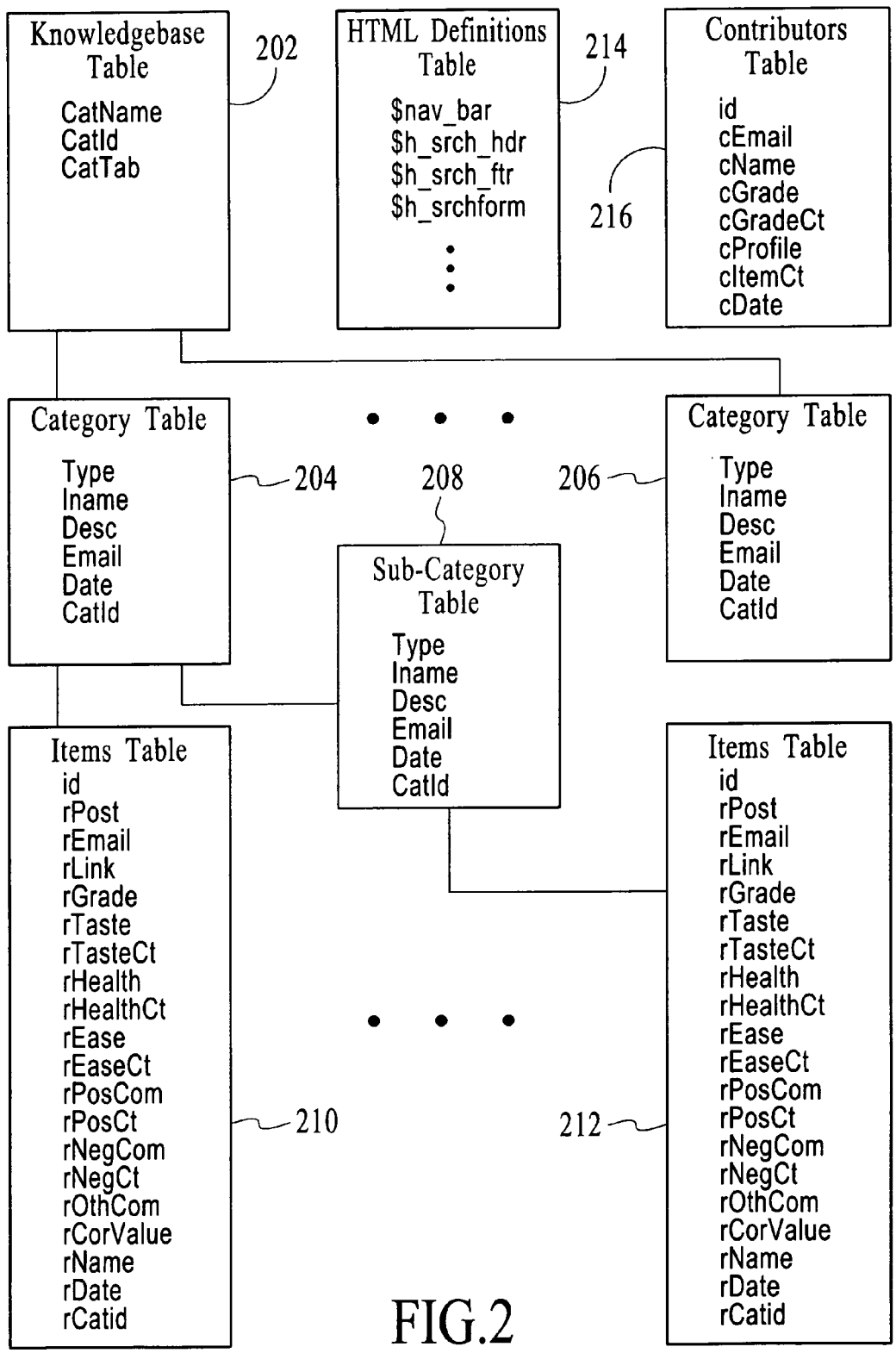
FIG. 2 is a diagram illustrating the database structure that is used to store the data in one embodiment of the invention.

FIG. 2 is a diagram illustrating the database structure that is used to store the data in one embodiment of the invention. A knowledge base consists of a hierarchically organized category structure. A category can contain either sub-categories or items. The example embodiment of the knowledge base system used for descriptive purposes in this discussion is implemented as a Cookbook, containing categories of food with recipes for cooking food items, in the common meaning of the word "cookbook". Items contain the knowledge entries as database records which depend on the particular application; for the CookBook an Item is a recipe.

The knowledge base is organized as a hierarchical structured category system, illustrated in FIG. 2. It is mapped into a database management software such as mySQL, which manages the storage, retrieval, and editing of the database records.

There is a single table kbtable 202 that lists as records all the categories currently in the knowledge base. The kbtable table includes the following field names for each record, with the indicated data types and uses:

TABLE 1

| Field Name | Use |
| --- | --- |
| CatName | the category name |
| CatId | a unique integer identifier that is auto incremented |
| CatTab | the category table name |

Each Category has its own table 204, and the knowledge base can contain additional category tables 206, or sub-category tables 208, etc., which can be added administratively or by a user. The Category table name is build from kbcat and the CatId. A category table 204 consists of the following field names for each record, with the indicated data types and uses:

TABLE 2

| Field Name | Use |
| --- | --- |
| Type | a type classifier of the record, with values enumerated as parent; or category, which contains only sub-categories; or child - which contains only items |
| Iname | a record name |
| Desc | a description, which is only non-null for a record of type category |
| Email | the email address of the user who created the record |
| Date | the date the record was created |
| CatId | a unique identifier from entry in kbtable |

Items are stored in an Item Table 210, and the knowledge base can contain additional item tables 212, etc., which can be added administratively or by a user. An Item record (in the case of the example embodiment of the invention, a recipe), is comprised of values of the following fields with the indicated data types and uses:

TABLE 3

| Field Name | Use |
| --- | --- |
| id | unique identifier allocated from kbtable |
| rPost | main body of the knowledge entry |
| rEmail | email address of contributor |
| rLink | link or source address |
| rGrade | overall grade value |
| rTaste | criteria 1 value |
| rTasteCt | criteria 1 count |
| rHealth | criteria 2 value |
| rHealthCt | criteria 2 count |
| rEase | criteria 3 value |
| rEaseCt | criteria 3 count |
| rPosCom | positive comments |
| rPosCt | positive comment count |
| rNegCom | negative comments |
| rNegCt | negative comment count |
| rOthCom | other comments |
| rCorValue | corroboration value |
| rName | item name |
| rDate | date created |
| rCatid | id of category to which item table is linked |

FIG. 2 also shows the HTML Customization Table 214. HTML representation for different applications can be achieved by a definition record table for each knowledge base called <knowledge-base name>-defs.inc. Each knowledge base contains a record in this table. The names of the fields are used as variables by components of the KnowledgeFilter Server software. The values of the fields are the blocks of static HTML which are used for display purposes with the indicated uses:

TABLE 4

| Field | Use |
| --- | --- |
| $nav_bar | navigation bar display, used on all pages |
| $h_srch_hdr | search header |
| $h_srch_ftr | search footer |
| $h_srchform | search form |
| $h_crCat_hdr | create a category header |
| $h_crCat | create category body |
| $h_itlist_hdr | header for list of items |
| $h_catlist_hdr | header for list of sub-categories |
| $h_catlist | for single sub-category |
| $h_catlist_ftr | footer of sub-category list |
| $h_item_hdr | footer of item display |
| $h_item | for single item display |
| $h_item_ftr | footer for item display |
| $h_itlist_hdr | header for item list |
| $h_itlist | for single item entry in list |
| $h_itlist_ftr | footer for item list |
| $h_ratedisp | display of ratings on item display |
| $h_recipe | item rPost display |
| $h_rateinput | ratings input for item display |
| $h_comments | display of comments |
| $h_varsort_hdr | variable sort display |
| $h_varsort_q | variable sort weighting question display |
| $h_crCom_hdr | create comment header |
| $h_crCom | create comment body |
| $h_crCom_ftr | create comment footer |

FIG. 2 also shows the Contributor Table 216, which is used to track contributors to the knowledge base and their contributions. A Contributor record is comprised of values of the following fields with the indicated data types and uses:

TABLE 5

| Field | Use |
| --- | --- |
| id | Contributor's id number |
| cEmail | email address |
| cName | name |
| cGrade | grade as rated by users |
| cGradeCt | number of times contributor is rated |
| cProfile | profile information about contributor |
| cItemCt | number of items contributed by contributor |
| cDate | date |

4. Object Application Programming Interface

In the embodiment of the invention described herein, the KnowledgeFilter Server is implemented in a programming language called PHP3. During operation of the Knowledge-Filter Server, various data objects are instantiated (that is, created) in RAM 118 in response to user actions. Each data object is a segment of code called a class. The following classes are created.

The Cat Class is a category object found in class. Cat.php3. It implements a knowledge base category and hides the database management software implementation from the user's commands. Its main methods are idInit, which initializes a given database id and category id; Create; InsertCat; and InsertItem.

The Item Class is an item object found in class.Item.php3. It implements the knowledge entry and hides the details of accessing the database and storing the object data. Its main methods are idinit, which initializes item given a database id, a category id and an item id; and Create.

The Item Class is an iterator object found in class.Iter.php3. It implements an object that iterates through a list of objects, either categories or items. Its main methods are CatIter which sets a Category; Next which finds the next element; and ItemIter which sets an item. The View Class is an object that allows different representations of criteria 1 through 3 plus overall grades, and can also display category and items lists. The Log Class is an object used for logging user information.

5. Commands

The following commands are utilized in the operation of the system. The user does not have explicit access to these commands by name, but rather the system invokes these commands in context, in response to user input through the user interfaces described in the next section.

User Commands, invoked by user actions, are given in the following Table, together with the software module in which the command is encoded, and the action or information returned by the command.

TABLE 6

| Command | Software Module | Action |
| --- | --- | --- |
| View Category | viewcat.php3 | Displays all sub categories or all items within the category. |
| Create Category | crCat.php3 | Creates a new category at specific point in the hierarchy. When the category is created returns to list current category. |
| Variable Sort | crVarSort.php3 | Performs a variable sort on items in a category. |
| View Item | viewitem.php3 | Item browser. |
| Create Comment | crCom.php3 | Adds comment to an existing item. |
| Create site map | crSiteMap.php3 | Creates a map of all the categories and items within a knowledge base. |

TABLE 6-continued

| Command | Software Module | Action |
| --- | --- | --- |
| Search Knowledge base | srchIndex.php3 | Searches categories or items in a given knowledge base. |
| Browse contributors | viewcontrib.php3 | |
| View detail about a contributor | viewdcon.php3 | |

Administrative Commands, invoked by actions of an administrator, are given in the following Table, together with the software module in which the command is encoded, and the action or information returned by the command.

TABLE 7

| Command | Software Module | Action |
| --- | --- | --- |
| Create navigation menu | rNav.php3 | Builds dynamic navigation menu. |
| Administrator category browser | admincat.php3 | Interface to administrator |
| Create new knowledge base | crNewKb.php3 | Creates new database and HTML customization definitions file. |
| Remove category | rmCat.php3 | Allows a category to be removed but only if all sub-categories or items have been already removed. |
| Remove Item | rmRec.php3 | Allows an item to be removed. |
| Update Item | upRec.php3 | Updates item entry. |

6. User Interface

Figure 3:
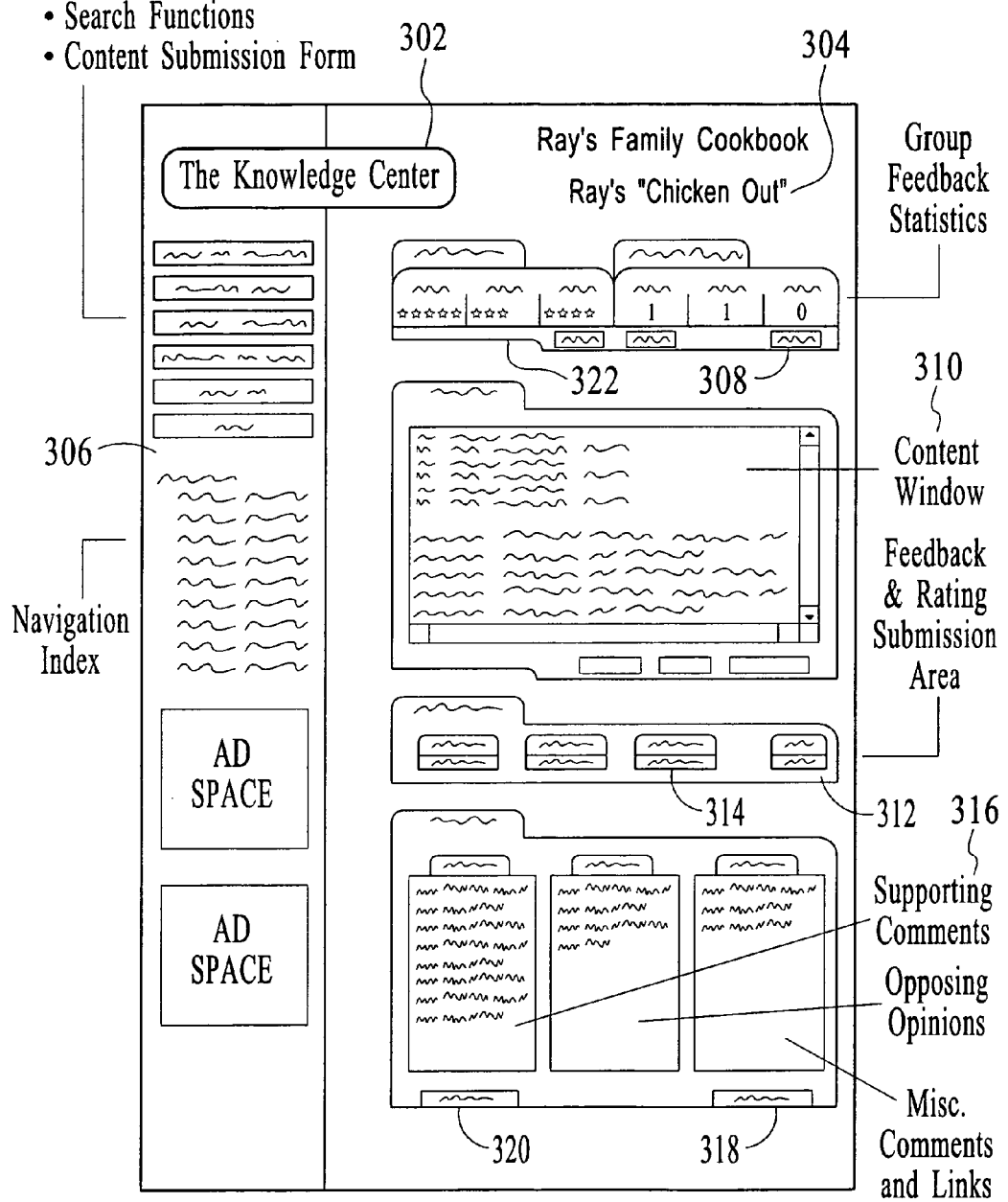
FIG. 3 is an illustration of the Knowledge Navigation Console user interface of one embodiment of the invention, showing navigation controls and various components of knowledge input and output of the system, showing an Item display.

FIG. 3 is an illustration of the Knowledge Navigation Console user interface of one embodiment of the invention, showing navigation controls and various components of knowledge output of the system, showing a Item display. The Knowledge Navigation Console 302 is the remote user interface for providing information concerning a subject. It includes the navigation controls and areas for various components of knowledge output and input of the system. It is comprised of:

1) an area 304 that shows the subject of the knowledge base;

2) the Navigation Area 306 that shows links to a knowledge base map related to the subject, links to search functions, and links to a content submission form, and a navigation index;

3) the Group Feedback Statistics Area 308 that shows statistics related to the subject of the knowledge base;

4) the Content Window 310 that displays the contents of an Item (a recipe in the case of the example embodiment of the invention); the Content Window can also be used to display results of knowledge base queries such as a category list 404 or an index page 502, discussed more fully below.

5) a Rating and Submission Area 312 that allows the user to provide information about the subject;

6) a Feedback Area 314 which allows a user to view feedback about the subject;

7) a graphic display format area 316 which provides a side-by-side display of comments supporting or disputing the content submission allowing individuals to make informed decisions and choices of what to believe or what methods to use to accomplish a particular goal;

8) a graphic display format area 318 which provides a display of other comments providing additional information, links or opinions on the content submission; and 9) an area 320 that allows a user to submit comments.

The Knowledge Navigation Console also contains a graphic display format which provides graphic symbols 322 for representing the aggregate rating scores for each criteria and for representing the level of comment support for the content submission.

Figure 4:
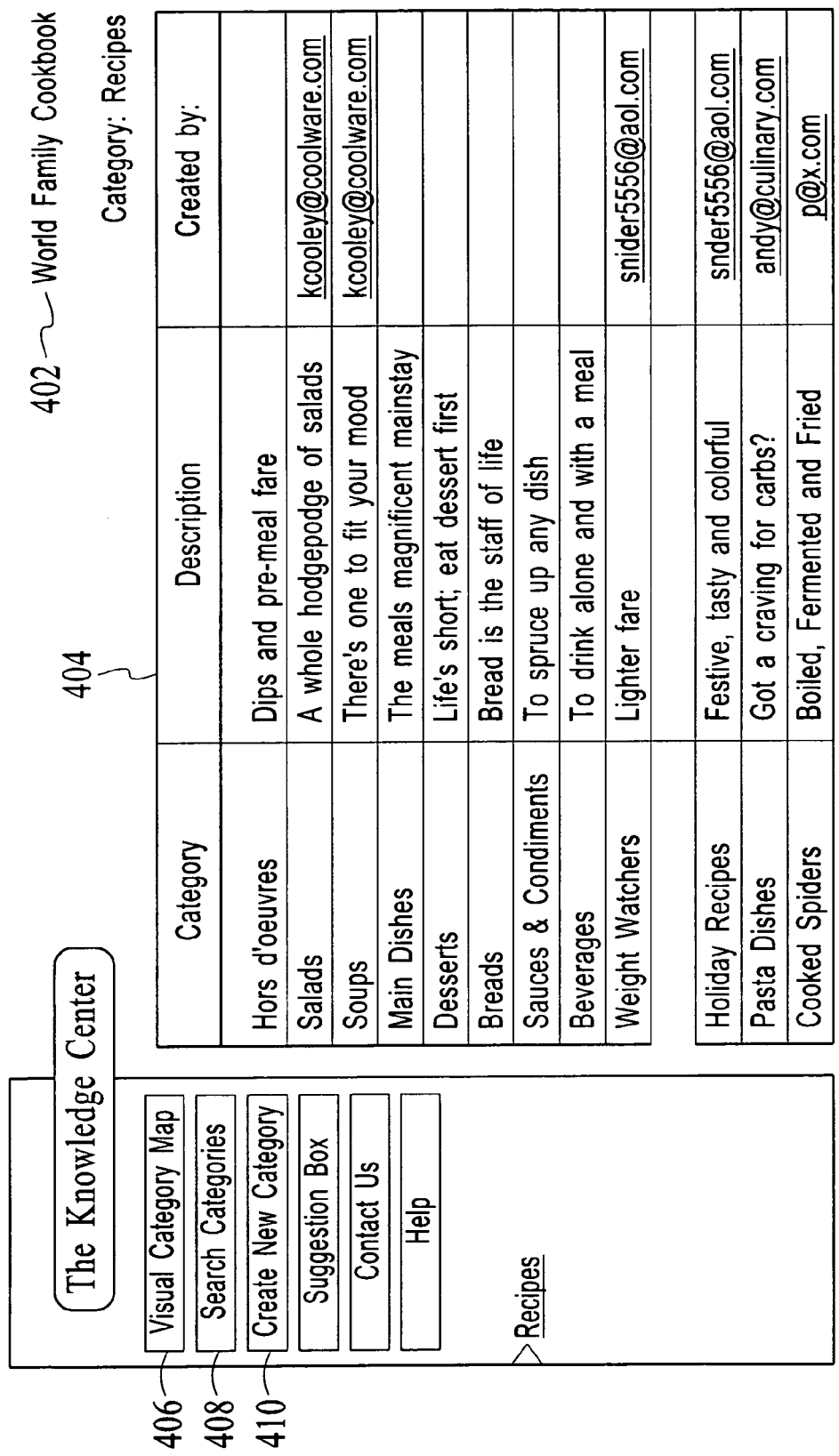
FIG. 4 is an illustration of the Knowledge Navigation Console user interface, showing a Category list for the knowledge base.

FIG. 4 is an illustration of the Knowledge Navigation Console user interface, showing a Category list for the knowledge base. A category list is shown in the content window 310. This display also contains context-sensitive changes in the navigation area 306, including:
1) a link 406 to a display of a Visual Category Map;
2) a link 408 to a display to Search Categories display; and
3) a link 410 to a display to Create a New Category.

Figure 7:
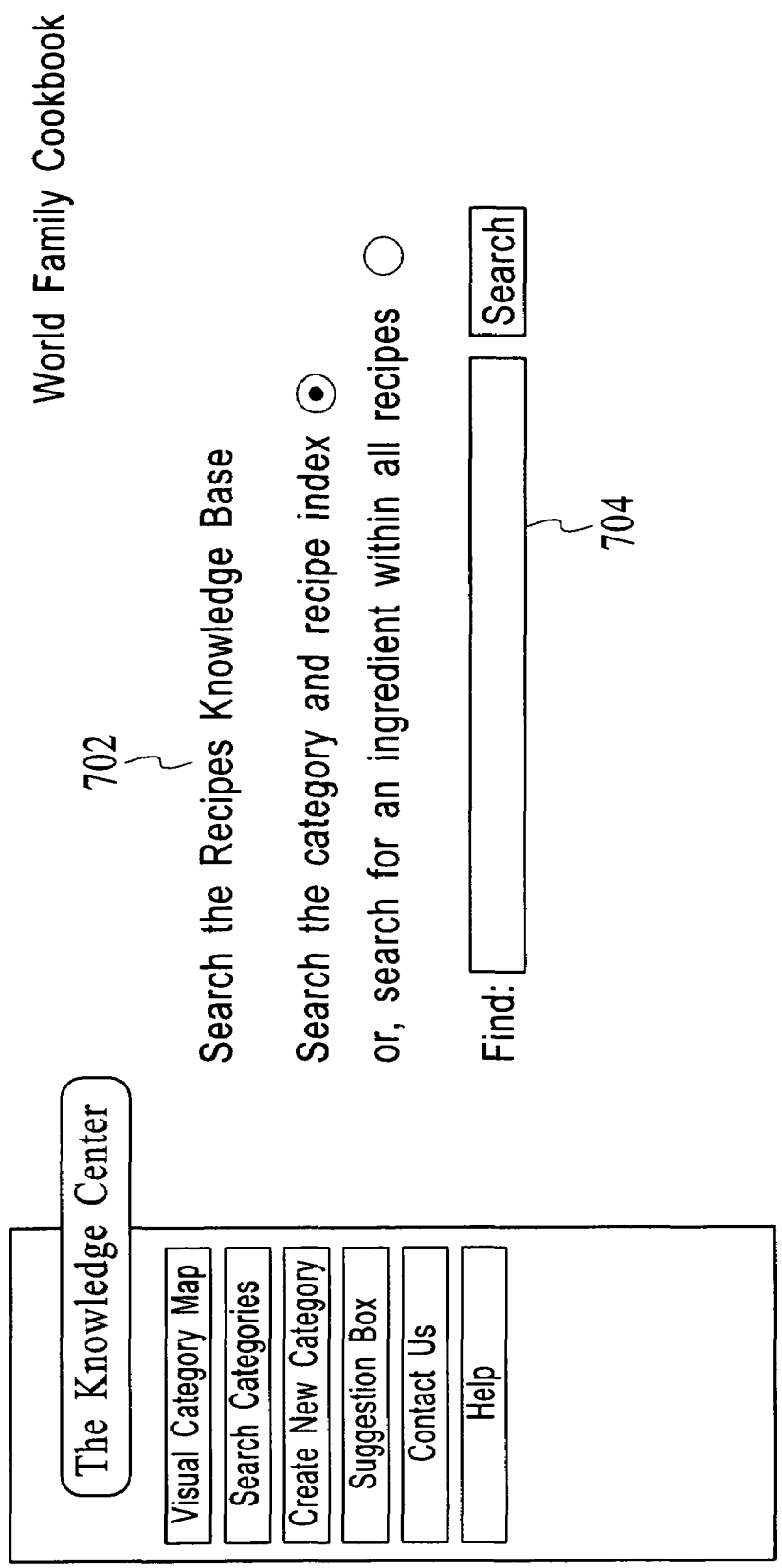
FIG. 7 is an illustration of the Search interface of one embodiment of the invention, through which the user can perform searches for items meeting certain criteria.

FIG. 5 is an illustration of the Index Window user interface of one embodiment of the invention, showing detailed features of the knowledge output of the system in response to a user query. An index page 502 showing standard and custom sorting options for lists of contributions to the knowledge base, is displayed in response to a user query. In the case of the embodiment of the invention in this description, the lists shown are recipes. The display is comprised of:
1) an area 504 in which a user can make sorting selections, including sort selections from a standard list 506; a quick sort button 508 which presents items sorted in accordance with a default such as by date of contribution of items; and a custom sort button 510 which brings up an auxilliary display 512 in which the user can make detailed selections rating the importance of sort criteria;
2) an area 514 where the sorted items are displayed in tabular form;
3) an area 516 in which search links are located, which when clicked bring up a context-sensitive search interface 702 shown in FIG. 7, in which the user can enter search terms in the input window 704.

FIG. 6 is an illustration of the display of the hierarchy of categories of the knowledge base. In the case of the present embodiment this display is a hierarchical list of recipes. Any item in this list can be clicked, bringing detailed information to the user in the form of the Knowledge Navigation Console 302 with the appropriate level of content displayed, such as a list of items 514.

In another embodiment of the invention, color coding of the subject descriptions corresponding to information items is used to provide a visual indication to the user of overall rating scores of the information items.

FIG. 8 is an illustration of the Comments interface of one embodiment of the invention, through which the user can submit positive, negative, or neutral comments. The user can enter comments about an item through the Comment interface 802, by writing in area 804. The comments can be tagged as positive or negative or neutral by means of radio buttons 806, and an email address can be added optionally 808 by the user to facilitate response from others.

Figure 9:
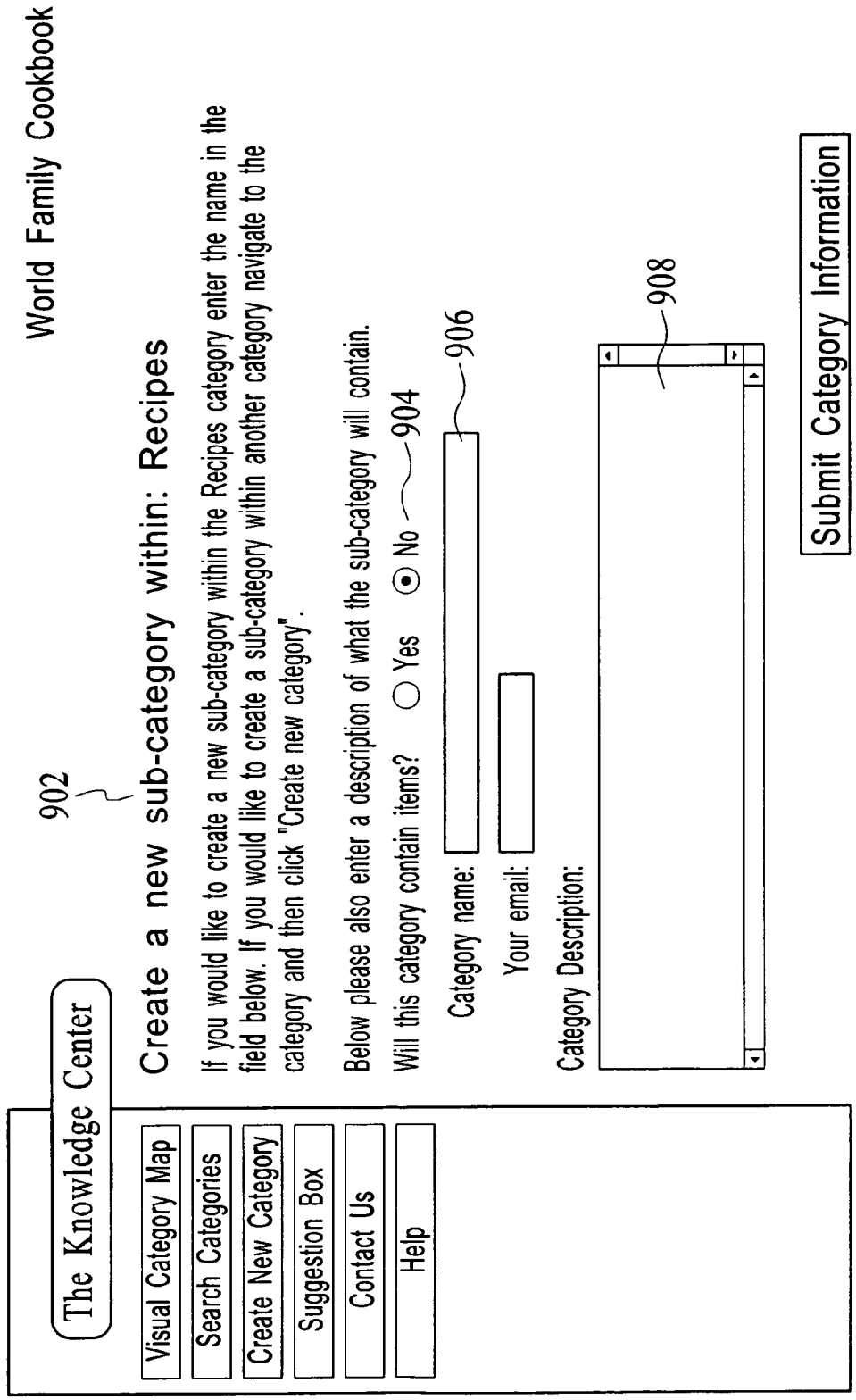
FIG. 9 is an illustration of the New Category Submittal interface.

FIG. 9 is an illustration of the New Category Submittal interface. The user employs the New Category Submittal interface 902 to create a new category. The user can select 904 whether the new category will contain items or subcategories (but not both), give the category a name 906, and a description 908.

FIG. 10 illustrates the New Item submittal interface 1002. In the case of the present example of this embodiment, the item submitted is a recipe. The interface is context-sensitive, and the category for which the submittal is being made is identified in words 1004. The user can submit the contents of an item in the input window 1006, as well as giving the item a name 1008, providing a link representing the source of the item 1010, and optionally giving an email address 1012 to facilitate correspondence between users of the system.

7. Use of the KnowledgeFilter System

Figure 11:
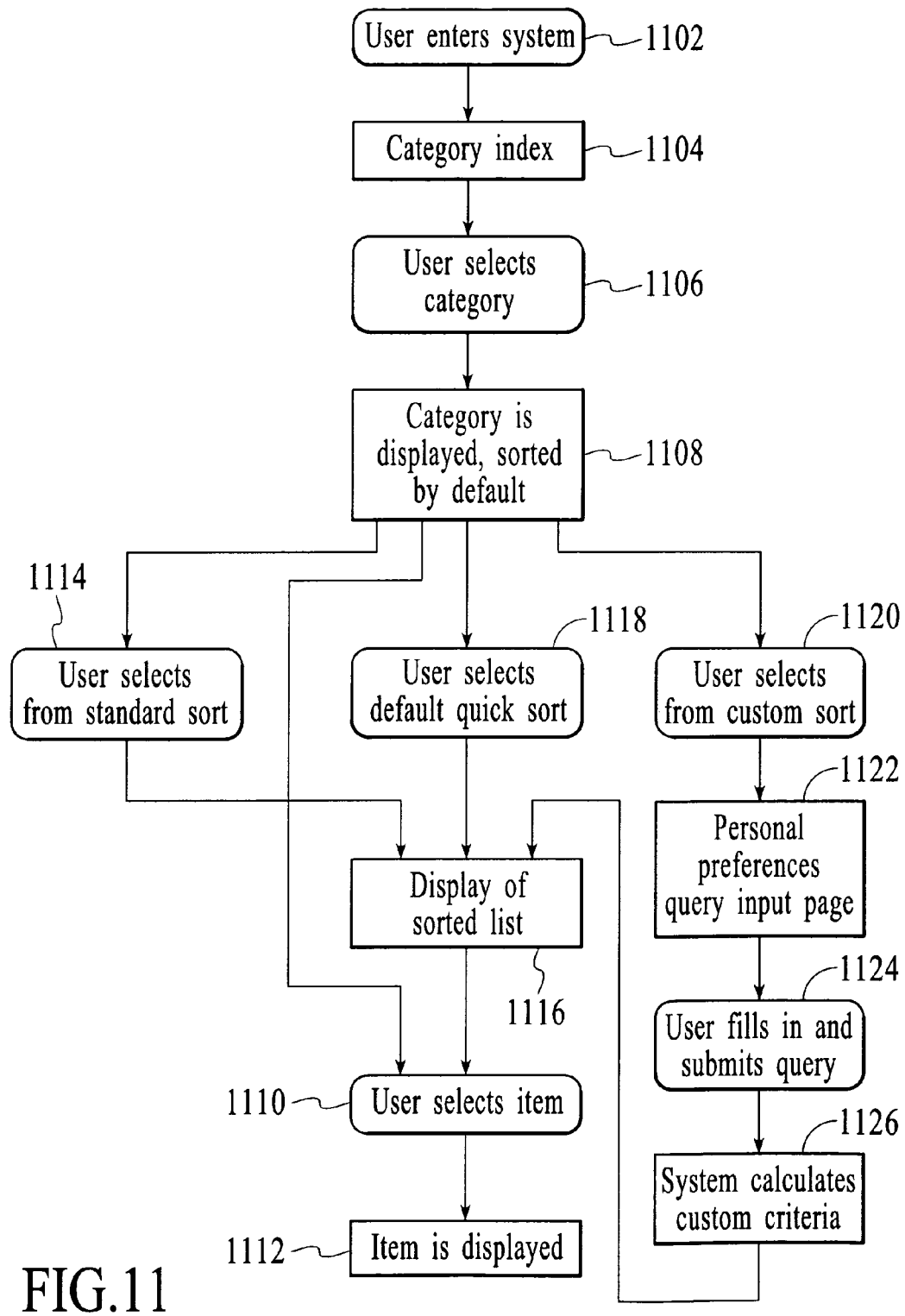
FIG. 11 is an activity diagram illustrating knowledge output of the KnowledgeFilter software in response to selection, viewing, and filtering activities of a user.

FIG. 11 is an activity diagram illustrating knowledge output of the KnowledgeFilter software in response to selection, viewing, and filtering activities of a user. The user enters the system by retrieving the Web page corresponding to the Uniform Resource Locator (URL) of the knowledge base 1102. This results in the display 1104 of the Knowledge Navigation Console 302 with a Category Index View contained in the contents area 306. The user can select a Category 1106, which initiates the View Category command. The system displays a list of items in the selected category 1108 sorted by a default sorting criterion, such as date of submission as implemented in this embodiment of the invention. The user can now take one of four actions.

1) The user may select an item 1110 for immediate viewing 1112 in display format 302.

2) The user may select from a set of standard sorting options 506 in response to which the system displays the items in the requested sorted order 1116.

3) The user may select a quick sort 1118, which sorts the items based on a default criterion (such as by date of submission) in response to which the system displays the items in the requested sorted order 1116.

4) The user may select a custom sort 1120. The system responds by presenting 1122 a selection interface 512, through which the user select personal preferences indicating the importance of each rating criterion, assign relative weights to various rating criteria, and submit 724 a custom sorting query, in response to which the system calculates 726 a sort order based on a weighted average of the users inputs, and displays the items in the requested sorted order 716, causing the most useful content to rise to the top of the list. After any of the sorting options 2)-4) described above, the user can select an item 1110 for immediate viewing 1112 in display format 302.

Figure 12:
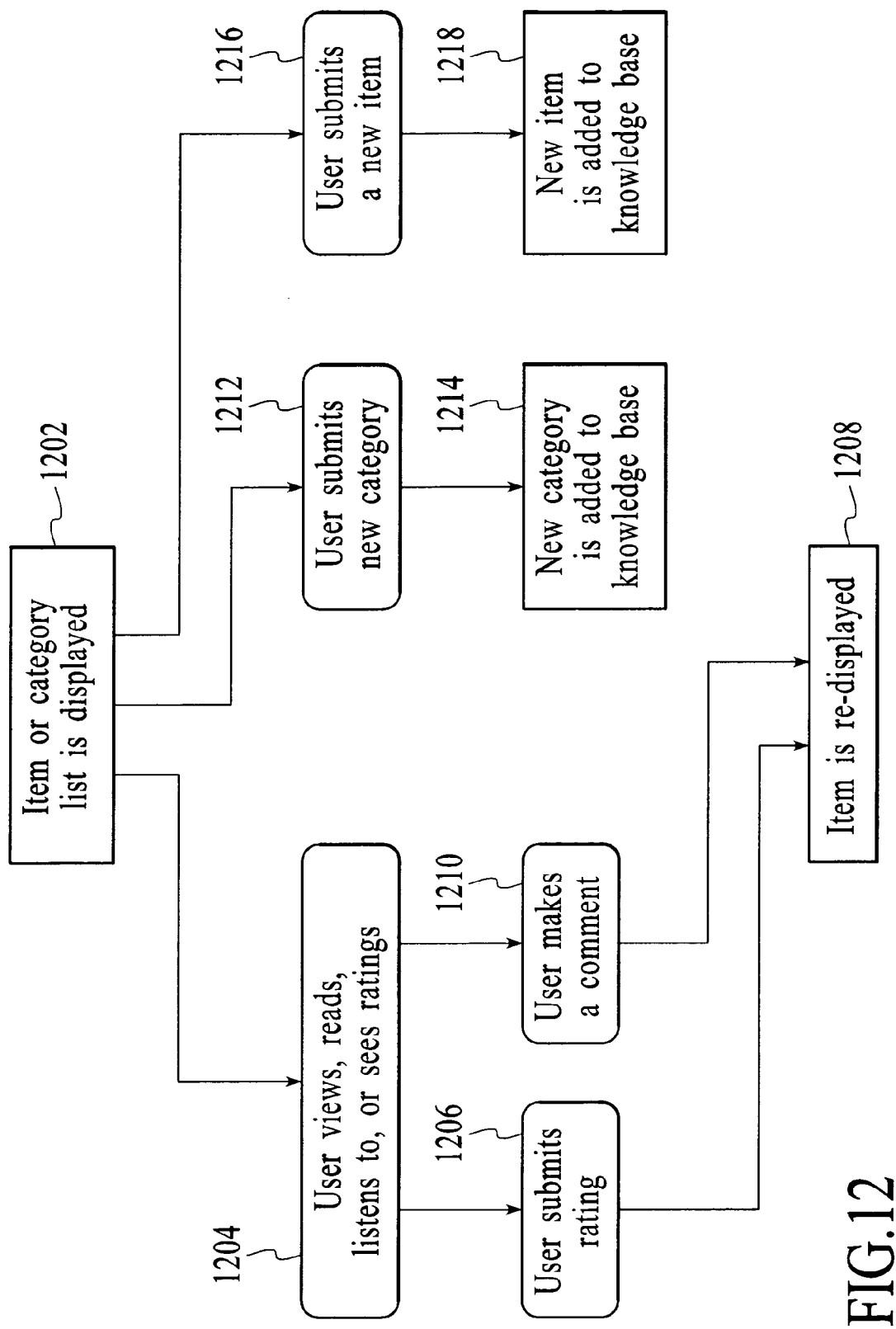
FIG. 12 is an activity diagram illustrating knowledge input activities of a user, showing rating activities, and submittal of new items.

FIG. 12 is an activity diagram illustrating knowledge input activities of a user, showing rating activities, and submittal of new items, and may be considered a continuation of FIG. 11. It shows rating activities, and submittal of new items. The user may view the knowledge base output of the system for a particular item 1202 displayed in the Knowledge Navigation Console 302.

The user can submit ratings 1206 of the displayed item by selecting from a range of predetermined values of rating variables 314 through the rating submission button in the rating submission area 312. The system responds by adding the ratings to the aggregate values for the item and redisplaying the item 1208. The system constrains the user by tracking and controlling the rating process to prevent the user from submitting multiple ratings of a single information item.

The system also tracks the aggregate ratings of contributors, allowing content item submissions to be sorted by contributor rating or ranking within the entire system. The user can also communicate with individual contributors by automated communication links. The user can also make comments 1210 by selecting the comment interface 802, and filling in the text area 804, and choosing to tag the comments as positive, negative, or neutral by means of the radio buttons 806. The system responds by adding the comments to the record for the item, recalculates the aggregate ratings, and redisplaying the item with the aggregate ratings, comments 1208, and level of comments support 308. From the Knowledge Navigation Console 302, with the category list displayed, the user can select 1212 to submit a new category through the Create a New Category interface 902. The system responds by adding the category to the list of categories and displaying the category list with the new category included.

From the Knowledge Navigation Console with the items list for a particular category displayed 502, the user can select to submit a new item through the New Item interface 1002. The system responds by adding the new Item to the knowledge base, and displaying the category with the new Item included. Since the default sort of items is by date of submission, the newly submitted item will appear at the top of the list of items. The new Item can now be viewed, and rated by the same or some different user(s), enhancing the value of the knowledge base.

Figure 13:
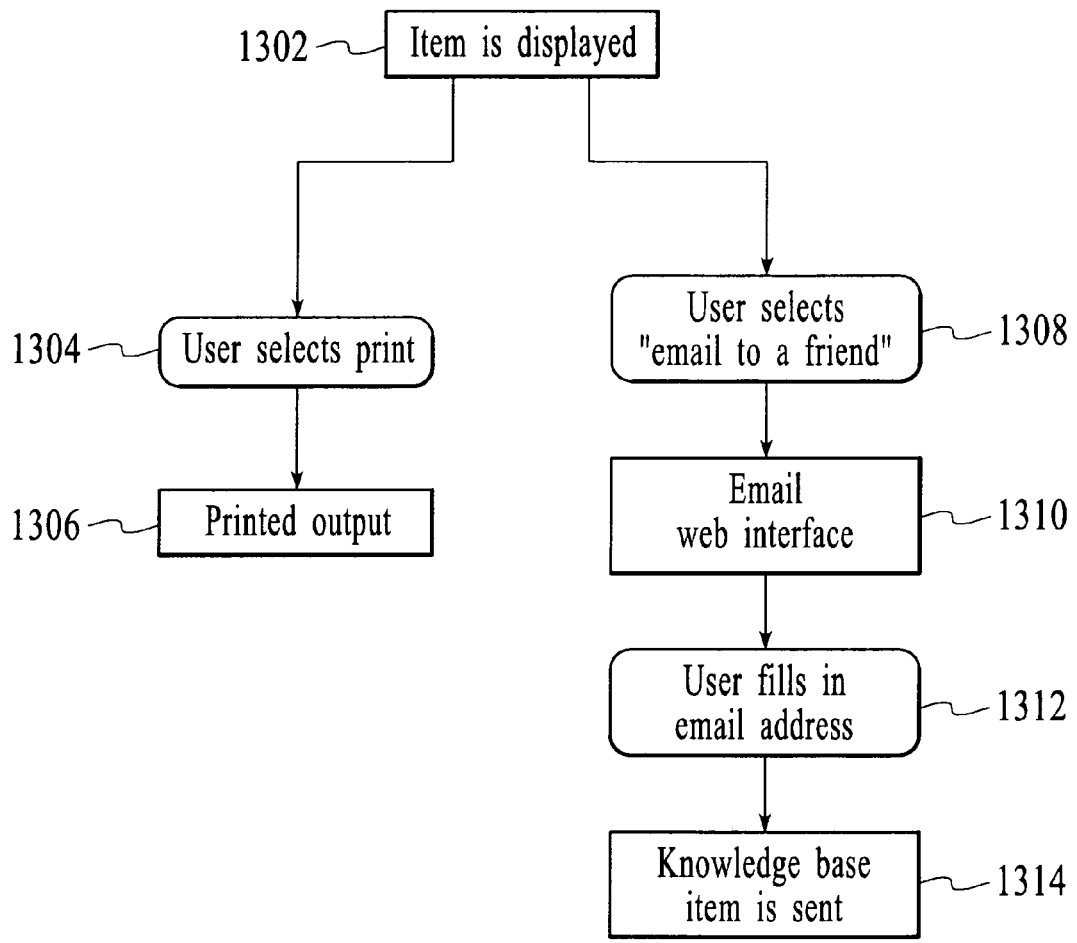
FIG. 13 is an activity diagram showing printing and emailing outputs of the KnowledgeFilter software in response to selection activities of a user.

FIG. 13 is an activity diagram showing printing and emailing outputs of the KnowledgeFilter software in response to selection activities of a user. From the Knowledge Navigation Console with an Item displayed 302, the user can select to print the Item 1304 which results in printed output 1306 through the browser's print function. The user can also select 1308 to email an Item to another individual. The system invokes an email interface 1310, enabling the user to fill in the recipient's email address 1312, and send the Item 1314.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A computer-implemented method, comprising:
   a computer system storing items of information in a database, wherein the items are received from a first set of two or more of a plurality of remote computer systems coupled to the computer system via a computer network;
   the computer system receiving, via the computer network, submissions regarding two or more particular ones of the stored items of information, wherein each submission is received from a corresponding one of a second set of two or more of the plurality of remote computer systems, wherein each of said submissions includes a rating and/or a comment regarding a corresponding one of the stored items that has been transmitted to the corresponding remote computer system via the computer network by the computer system;
   the computer system storing the received submissions in the database;
   the computer system receiving a request from a given one of the plurality of remote computer systems to view a listing of the stored items of information according to an ordering consistent with a selected criterion that pertains to the stored submissions; and
   responsive to the request, the computer system providing a first set of data to the given remote computer system, wherein the first set of data is usable on the given remote computer system to display said listing of the stored items according to said ordering.

2. The method of claim 1, wherein a first of said submissions includes a comment and is received from a particular one of said second set of two or more remote computer systems, wherein the comment regards a first of the two or more particular stored items of information, the method further comprising:
   receiving from said particular remote computer system categorization information that indicates whether the comment is positive or negative relative to the first stored item of information; and
   storing the categorization information in association with the first submission in the database.

3. The method of claim 1, wherein said submissions include positive comments and negative comments regarding said two or more particular ones of the stored items of information, wherein said selected criterion includes a ratio of number of positive comments to number of negative comments.

4. The method of claim 1, wherein the database includes an extensible hierarchy of information categories, wherein the method further comprises permitting said given remote computer system to navigate through the extensible hierarchy.

5. The method of claim 4, wherein the request is received from the given remote computer system after receiving information from the given remote computer system indicating that a user of the given remote computer system has elected to navigate to a particular one of the information categories within the extensible hierarchy, wherein said stored items of information are associated with the particular information category.

6. The method of claim 1, further comprising:
   the computer system receiving user ratings via the computer network, wherein each of the user ratings is a rating of a user who has contributed at least one of the items of information, wherein at least one of the user ratings is received from a first user that is different from the user being rated.

7. The method of claim 6, the method further comprising:
   the computer system receiving a second request from another one of the plurality of remote computer systems to view a second listing of the stored items of information according to a second ordering that is consistent with a second criterion that pertains to the user ratings; and
   responsive to the second request, the computer system providing a second set of data to the other remote computer system, wherein the second set of data is usable on the other remote computer system to display said second listing of the stored items according to the second ordering.

8. The method of claim 1, wherein the computer system maintains at most one rating per contribution source for any given one of the stored items of information.

9. The method of claim 1 further comprising:
   controlling said receiving and said storing of the submissions to prevent a given contribution source from rating a given one of the stored items of information more than once.

10. The method of claim 1, wherein the submissions include a plurality of comments regarding a selected one of said two or more particular stored items of information, the method further comprising the computer system providing a second set of data to said given remote computer system, wherein the second set of data is usable on the given remote computer system to display: the plurality of comments regarding the selected item, and an indication of one or more aggregate ratings of the selected item.

11. The method of claim 10, wherein said plurality of comments include one or more positive comments and one or more negative comments regarding the selected item of information, wherein the second set of data includes the plurality of comments and information specifying a first window and a second window, where the positive comments are assigned to the first window and the negative comments are assigned to the second window.

12. The method of claim 1, wherein the first set of two or more remote computer systems and the second set of two or more remote computer systems are overlapping sets.

13. The method of claim 1, wherein the given remote computer system is a member of said first set of two or more remote computer systems and/or a member of the second set of two or more remote computer systems.

14. The method of claim 1, wherein a first of the two or more particular items of information is received from a particular one of the first set of two or more remote computer systems, wherein a first of the submissions includes a comment regarding the first item of information, wherein the first submission is received from a particular one of said second set of two or more remote computer systems, wherein said particular remote computer system of the first set is different from said particular remote computer system of the second set.

15. The method of claim 1, wherein a first of the submissions includes a comment regarding a first of the two or more particular stored items of information, wherein the first submission is authored by a different person than the first stored item of information.

16. A computer-readable memory medium storing program instructions that are executable on a computer system to:
    store items of information in a database wherein the items are received from a first set of two or more of a plurality of remote computer systems coupled to the computer system via a computer network;
    receive, via the computer network, submissions regarding two or more particular ones of the stored items of information, wherein each submission is received from a corresponding one of a second set of two or more of the plurality of remote computer systems, wherein each of said submissions includes a rating and/or a comment regarding a stored item of information to which the corresponding remote computer system has been granted access by the computer system;
    store the received submissions in the database;
    receive a request from a given one of the plurality of remote computer systems to view a listing of the stored items of information according to an ordering consistent with one or more selected criteria, wherein a first of the one or more selected criteria pertains to the stored submissions; and
    responsive to the request, provide a first set of data to the given remote computer system, wherein the first set of data is usable on the given remote computer system to display more said listing of the stored items according to said ordering.

17. The computer-readable memory medium of claim 16, wherein a first of said submissions includes a comment regarding a first of the two or more particular stored items of information, wherein the first submission is received from a particular one of the second set of two or more remote computer systems, wherein the program instructions are executable by the computer system to receive classification information from said particular remote computer system, wherein the classification information identifies the first comment as being positive or negative relative to the first stored item of information.

18. The computer-readable memory medium of claim 17, wherein said submissions include positive comments and negative comments regarding said two or more particular ones of the stored items of information, wherein said first selected criterion includes a ratio of positive comments to negative comments.

19. The computer-readable memory medium of claim 16, wherein the database includes an extensible hierarchy of knowledge categories, wherein the program instructions are executable to permit said given remote computer system to navigate through the extensible hierarchy.

20. The computer-readable memory medium of claim 19, wherein the program instructions are executable by the computer system to receive the request from the given remote computer system after receiving information from the given remote computer system indicating that a user of the given remote computer system has elected to navigate through the extensible hierarchy to a particular knowledge category.

21. The computer-readable memory medium of claim 16, wherein the program instructions are executable by the computer system to receive user ratings via the computer network, wherein each of the ratings is a rating of a user who has contributed at least one of the items of information, wherein at least one of the user ratings is received from a first user that is different from the user being rated.

22. The computer-readable memory medium of claim 21, wherein a second of the one or more selected criteria pertains to the user ratings.

23. The memory medium of claim 16, wherein the program instructions are executable to maintain at most one rating per contribution source for any given one of the stored items of information.

24. The computer-readable memory medium of claim 16, wherein the submissions include a plurality of comments regarding a selected one of said two or more particular stored items of information, wherein the program instructions are executable by the computer system to provide a second set of data to the given remote computer system, wherein the second set of data includes: the plurality of stored comments regarding the selected item, and an indication of an aggregate rating of the selected item.

25. The computer-readable memory medium of claim 16, wherein the first set of two or more remote computer systems and the second set of two or more remote computer systems have one or more common members.

26. The computer-readable memory medium of claim 16, wherein the given remote computer system is a member of said first set of two or more remote computer systems and/or a member of the second set of two or more remote computer systems.

27. An apparatus, comprising:
    a network interface configured for coupling to a computer network;
    one or more processors; and
    a memory storing program instructions executable by the one or more processors to:
        store items of information in a database, wherein the items are received from a first set of two or more of a plurality of remote computer systems via the computer network;
        receive, via the computer network, submissions regarding two or more particular ones of the stored items of information, wherein each submission is received from a corresponding one of a second set of two or more of the plurality of remote computer systems, wherein each of said submissions includes a rating and/or a comment regarding a stored item of information that has been transmitted to the corresponding remote computer system via the computer network by the computer system;
        store the submissions in the database;
        receive a request from a given one of the plurality of remote computer systems to view a listing of the stored items of information according to an ordering consistent with one or more selected criteria, wherein at least one of the selected criteria pertains to the stored submissions;

responsive to the request, provide a first set of data to the given remote computer system, wherein the first set of data is usable on the given remote computer system to display said listing of the stored items of information according to said ordering.

28. The apparatus of claim 27, wherein a first of the submissions includes a comment regarding a first of the two or more particular stored items of information, wherein the first submission is received from a particular one of the second set of two or more remote computer systems, wherein the program instructions are executable by the one or more processors to receive classification information from said particular remote computer system, wherein the classification information identifies the comment as being positive or negative relative to the first item of information.

29. The apparatus of claim 27, wherein said submissions include positive comments and negative comments regarding said two or more particular ones of the stored items of information, wherein said at least one of the selected criteria includes a first criterion based on a number of positive comments and a number of negative comments per item of information.

30. The apparatus of claim 27, wherein the database includes an extensible hierarchy of subject areas, wherein the program instructions are executable by the one or more processors to permit said first set of two or more remote computer systems and said second set of two or more remote computer systems to navigate through the extensible hierarchy.

31. The apparatus of claim 30, wherein the program instructions are executable by the one or more processors to receive the request after receiving information from the given remote computer system indicating that a user of the given remote computer system has elected to navigate to a particular subject area of the extensible hierarchy, wherein the particular subject area includes the stored items of information.

32. The apparatus of claim 27, wherein the program instructions are executable by the one or more processors to:

receive user ratings via the computer network, wherein each of the user ratings is a rating of a user who has contributed at least one of the items of information; and storing the user ratings in the database.

33. The apparatus of claim 32, wherein the program instructions are executable by the one or processors to:

receive a second request from another one of the plurality of remote computer systems to view a second listing of the stored items of information according to a second ordering that is consistent with the user ratings; and responsive to the second request, provide a second set of data to the other remote computer system, wherein the second set of data is usable on the other remote computer system to display said second listing according to the second ordering.

34. The apparatus of claim 27, wherein the program instructions are executable by the one or more processors to maintain at most one rating per contribution source for any given one of the stored items of information.

35. The apparatus of claim 27, wherein the program instructions are executable by the one or more processors to:

control said receiving and said storing of the submissions to prevent a given contribution source from rating a given one of the stored items of information more than once.

36. The apparatus of claim 27, wherein the submissions include a plurality of comments and a plurality of ratings regarding a selected one of said two or more particular stored items of information, wherein the program instructions are executable by the one or more processors to:

provide a second set of data to said given remote computer system, wherein the second set of data is usable on the given remote computer system to display: the plurality of comments regarding the selected item, and an indication of an aggregate rating of the selected item, wherein the aggregate rating is determined based on the plurality of ratings of the selected item.

37. The apparatus of claim 27, wherein the first set of two or more remote computer systems and the second set of two or more remote computer systems have one or more common members.

38. The apparatus of claim 27, wherein the given remote computer system is a member of said first set of two or more remote computer systems and/or a member of the second set of two or more remote computer systems.

39. The apparatus of claim 27, wherein the program instructions are executable by the one or more processors to send a second set of data to the given remote computer system via the computer network in response to a navigation command received from the given remote computer system via the computer network, wherein the second set of data includes a listing of different items of information from the database.

40. The apparatus of claim 27, wherein the one or more selected criteria are determined by selection information received from the given remote computer system.

* * * * *